(12) United States Patent
Chan et al.

(10) Patent No.: US 6,563,960 B1
(45) Date of Patent: May 13, 2003

(54) METHOD FOR MERGING IMAGES

(75) Inventors: San San Chan, Singapore (SG); Chiau Ho Ong, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/407,684

(22) Filed: Sep. 28, 1999

(51) Int. Cl.$^7$ .............................. G06K 9/36; G09G 5/00
(52) U.S. Cl. ..................... 382/284; 345/626; 345/629
(58) Field of Search .................... 382/284, 232, 382/294, 233, 279, 283, 275; 358/517; 345/626, 629, 630, 631, 639

(56) References Cited

U.S. PATENT DOCUMENTS

| | | | | |
|---|---|---|---|---|
| 5,581,667 A | * | 12/1996 | Bloomberg | ................ 395/1.9 |
| 5,691,818 A | * | 11/1997 | Newell et al. | ............. 358/3.07 |
| 6,049,390 A | * | 4/2000 | Notredame et al. | ........ 358/1.15 |

* cited by examiner

*Primary Examiner*—Bhavesh Mehta
*Assistant Examiner*—Kanji Patel

(57) ABSTRACT

A method for merging images is disclosed. The present invention may be implemented as a method for merging two or more images to produce a merged image using a mask. Each of these images has mutually corresponding pixels. In other words, each pixel value in an image has a spatially corresponding pixel in the other images. The mask has mask values, each mask value corresponding to a pixel in an image. The mask value is used to determine the corresponding pixel value of the merged image. One embodiment uses this mask value to set a corresponding pixel value of the merged image to a pixel value of one of the two or more images. Another embodiment uses the mask value as a weight. This weight is used to calculate the pixel value as a combination of corresponding pixel values of the two or more images. By using such a mask, a merged image may be formed avoiding artifacts resulting from decompressing a highly compressed image.

7 Claims, 3 Drawing Sheets

METHOD FOR MERGING IMAGES

FIELD OF INVENTION

This invention relates to a method for merging images. In particular, the invention relates to a method implemented in a printing device for merging a user-input image and a stored template image into a merged image for printing.

BACKGROUND

Printers today are able to print at high resolution on a variety of media. For example, some printers are able to print at resolution of up to 1200 dots per inch (dpi) on photo-quality paper to produce printouts of a quality comparable to developed photographs. Some of these printers include a feature for merging a user-input image with a selected template image to produce a merged image printout, which is otherwise not easily achievable with standard photographs. This merging of images feature allows novice users to create fanciful printouts of their choice easily and economically.

FIG. 1 shows a prior art method for combining a user image 2 and a template image 4 to produce a merged image 6 by defining cutout portions, such as a portion 8, in the template image 4. Portions of the user image 2 which spatially corresponds to the cutout portion 8 are used to fill-in the cutout portion 8 to produce the merged image 6. The pixel values in the cutout portion 8 in the template image 4 are identified by a unique value. During merging, each pixel in the template image 4 is examined in turn. If the value of a template pixel is equal to the unique value, a spatially corresponding pixel in the merged image will take the value of a spatially corresponding pixel in the user image. Otherwise, the pixel in the merged image will take the value of the template pixel. An example of a unique value is a specific pixel value for black.

In a configuration where a printer is connected to a computer, the image-merging feature can be performed in either the printer or the computer. The template images can be stored accordingly. To store a template image of a physical size of 3.5" by 5.5Δ at a resolution of 300 dpi, with each pixel being represented by 3 bytes of data, a total of 5.2 mega-bytes (MB) of memory is conventionally needed. This memory size is large and is therefore prohibitively costly for any printer targeted at home users. Furthermore, such an image-merging feature would only be appealing if several template images are made available. These template images can be stored on a computer where memory is usually more abundant than available on a printer. This storing of template images on a computer would render image merging to be most appropriately performed on the computer with a resultant merged image being sent to the printer for printing. Using such a method of image merging will require that an image captured on digital equipment such as digital cameras, photo scanners and digital recorders, be loaded onto the computer and merged with the template image in the computer before any printing is possible. It would be advantageous to bypass the computer and have the digital equipment directly load a captured image onto a printer and have the printer merge the captured image with a locally-stored template image for printing. Incidentally, the template images should be efficiently stored on the printer to minimize the memory requirement to support such an image-merging feature.

One possible way to reduce the memory requirement for storage of template images is to compress the template images. However, many existing compression methods, such as the JPEG compression standard, are lossy. In the JPEG compression, data is shed to give a smaller image data size at the expense of image quality. Even with such compression, which can reduce the amount of memory required to about one-tenth of that required to store a raw image, about 500 kilo-bytes (KB) is still required for each template image. This memory size is still large by any standard. Storing the template images at a lower resolution, for example at 100 dpi instead of 300 dpi, helps in reducing memory requirement. A compressed template of size of about 50K is achievable. However, this lower resolution template image will result in disadvantages during reproduction. Firstly, the template image will need to be scaled back up to 300 dpi in a process which will consume processor time and therefore reduce overall printing speed. The scaling up of the template image will result in what is known as a gray-edge phenomenon, where a grayish outline appears along the edges of objects in an image. Secondly, a reproduction of a highly compressed image results in compression artifacts 7. Such artifacts appear both in the cutout regions and other regions in the template image. The artifacts 7 in the cutout portions 8 will remain in the merged image 6 to result in a reduced quality merged image 6.

A commonly used compression technique that does not result in compression artifacts is the Run Length Encoding (RLE) method. This method works well for encoding a continuous run of a same byte, such as the black values used to define the cutout portions. Typically, cutout regions occupy about three quarters of a template image. These three quarters of the template image can be effectively compressed using RLE. However, the remaining quarter which holds template objects in the template image is still of considerable 1.3 MB for a 5.2 MB template image. By today's standard, a memory of this size is too costly to be included into a consumer product if cost is a concern. Although compression artifacts are avoided when using RLE, the same level of compression achievable with JPEG compression cannot be attained. As such JPEG compression of a template image remains a better choice if the size of a compressed template image is a concern.

The foregoing therefore creates the need for a method of merging a template image which is highly compressed with a user image to produce a merged image which is relatively free of compression artifacts.

SUMMARY

In one aspect, the present invention may be implemented as a method for merging two or more images to produce a merged image using a mask. Each of the images has mutually corresponding pixels. In other words, each pixel value in an image has a spatially corresponding pixel in the other images. The mask has mask values, each mask value corresponding to a pixel in an image. The mask value is used to determine the corresponding pixel value of the merged image. One embodiment uses this mask value to set a corresponding pixel value of the merged image to one a corresponding pixel value in one of the images. Another embodiment uses the mask value as a weight. This weight is used to calculate the pixel value as a combination of corresponding pixel values of the images.

By using such a mask, a merged image may be formed without artifacts resulting from decompressing a highly compressed image.

In another aspect, a system for merging two or more images according to a preferred embodiment of the invention includes a mask and an image generator. The mask has values for determining the composition of a merged image. The image generator generates the merged image in accordance with the mask values. The mask values are derived from attributes in at least one of the two or more images for identifying in the images a background and image portions to be overlaid upon the background to form the merged image.

BRIEF DESCRIPTION OF DRAWINGS

The invention will be better understood with reference to the drawings, in which.

DETAILED DESCRIPTION OF THE PREFERRED EMBODIMENT

Figure 1:
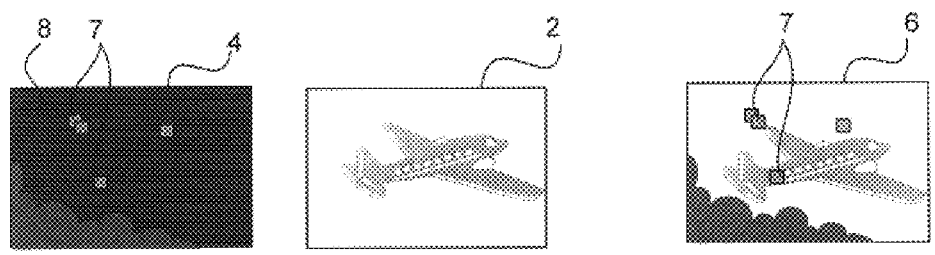
FIG. 1 is a pictorial diagram showing a decompressed template image having artifacts, a user image and a merged image as a result of merging the user and template images. The artifacts appear in the merged image.
Figure 2:
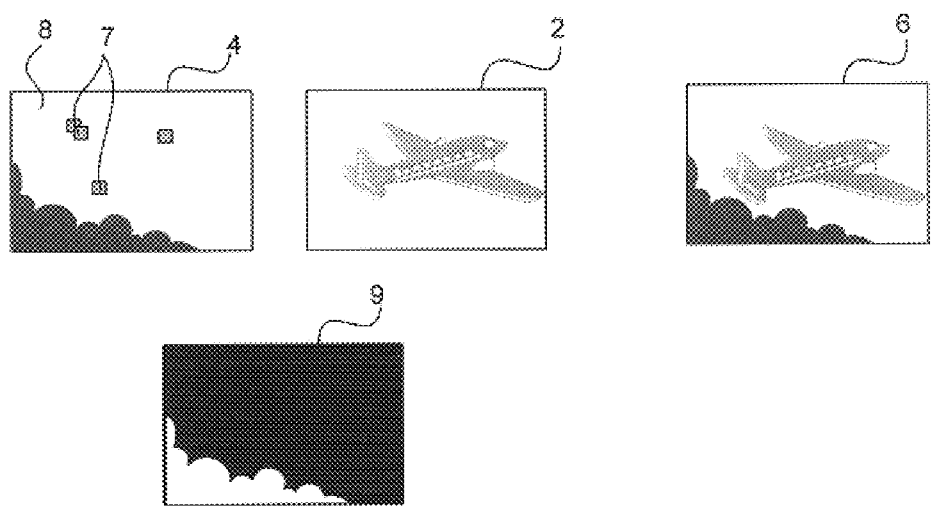
FIG. 2 is a pictorial diagram showing a decompressed template image having artifacts, a user image and a merged image as a result of merging the user and template image using a mask. The mask filters out the artifacts to produce a merged image free from artifacts.

The invention is described using a preferred embodiment for merging a user image with a compressed template image. FIG. 2 is a pictorial diagram of a decompressed template image 4 with artifacts 7, a user image 2 and a merged image as a result of merging the template image 4 and the user image 2 using a mask 9. The preferred embodiment is implemented on but not limited to a device such as a color inkjet printer. The following description covers only the merging of the images as implemented in such a printer. Descriptions for the other forms of processing in the printer, for example half-toning, are omitted because they are known to those skilled in the art.

In the printer, the template image is compressed so as to minimize memory required to store it. Accordingly, this minimized memory requirement will allow the storage of a larger number of templates for a given size of memory. In the preferred embodiment, a JPEG compression method is used to compress a template image. This compression method is highly effective and results in a compact template image. Other compression methods, such as GIF, TIFF, etc. are also applicable. JPEG compression is preferably performed with a compression ratio of 1:10 on a template image defined at a resolution of 100 dpi. Many effective compression methods are lossy and will produce some form of compression artifacts. It is these artifacts which the present invention of image merging seeks to reduce or eliminate.

Figure 3:
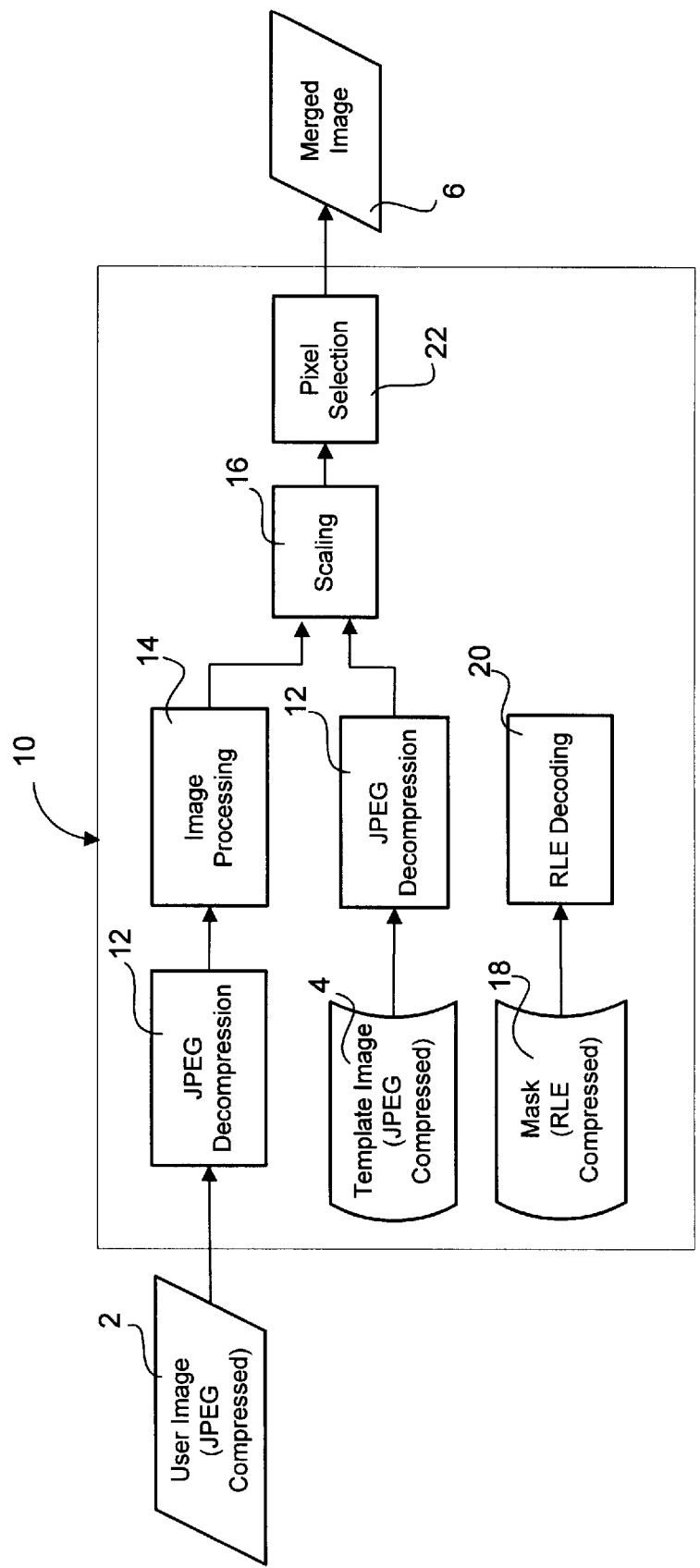
FIG. 3 is a block diagram showing components of a system which supports a method of merging images according to the present invention.

FIG. 3 is a block diagram of system components in an inkjet printer 10 for receiving the user image 2 for merging with a locally-stored template image 4. These components may be implemented in either hardware, firmware, software or combination thereof known to those skilled in the art. A user of such an inkjet printer 10 will typically send a user image 2 to the inkjet printer 10 from a device such as a digital camera (not shown). This user image 2 is usually compressed using the JPEG standard. Such a compressed image reduces the storage requirements of the image in the digital camera. In addition such an image reduces the time required for accessing and downloading the image to the printer 10. JPEG is the abbreviation for Joint Photographic Experts Group, which developed the standard. On receiving the JPEG compressed user image 2, a JPEG decompression component 12 converts the JPEG compressed user image back to a raw-data user image. This raw data user image can then be optionally enhanced using known image processing algorithms. Some of these algorithms include smoothing and sharpening of the raw data. In addition to receiving a JPEG compressed user image 2, the inkjet printer 10 is able to receive a command to merge the user image 2 with a selected template image 4. This template image is preferably stored in a compressed format as previously described. JPEG decompression is also performed on this template image to obtain a raw data of the selected template image 4. As previously described, artifacts 7 will be present on such a decompressed template image. The raw data for both the user image 2 and the template image 4 are then scaled according to this preferred embodiment to a required resolution in a SCALING component 16. The output of this SCALING component is a user image and a template image scaled preferably to a same resolution. That is, each pixel in a user image 2 has a spatially corresponding pixel in the template image 4. It should be noted that the merging of images according to the present invention is applicable to images of different resolutions.

Each template image has an associated mask 9. The mask 9 defines the edges of objects in the template image, thereby enabling the mask to be defined to avoid or mask artifacts which may be strewn over cut-out regions 8 on the template image 4 during reproduction. As an example, the mask 9 may contain hexadecimal mask values of 00's and FF's. Each of these values have a one-to-one relationship with a pixel in a merged image 6 according to the preferred embodiment. However, a one-to-many relationship can also be used in the practice of this invention. The mask values determine the pixel values in the merged image 6. The 00 and FF mask values will cause corresponding pixels in the merged image 6 to assume pixel values of the template and user images 4, 2 respectively. In other words, mask values corresponding to cutout regions 8 of the template image 4 are given the value FF. Alternatively, the mask values can assume gray-scale-like values or weights to produce a fading effect in the merged image 6. These mask values are used for the description of this preferred embodiment. The mask 9 can be created with software tools for editing, manipulating, and collaging bitmapped images. One such software tool is the professional photo-editing program Photoshop, available from Adobe Systems Inc., San Jose, Calif., U.S.A.

The mask 9 can be run length encoded (RLE) to reduce its overall byte size to minimize storage requirement. As such a mask 9 is envisaged to contain continuous runs of a same byte RLE serves as an effective method to compress the mask by encoding its data. During merging, an encoded mask is decompressed by decoding the encoded data to obtain the raw data of the mask. The mask values are used in a Pixel Selection component 22 to determine corresponding pixel values of a merged image 6. The method of pixel selection will be described in more detail shortly.

Figure 4:
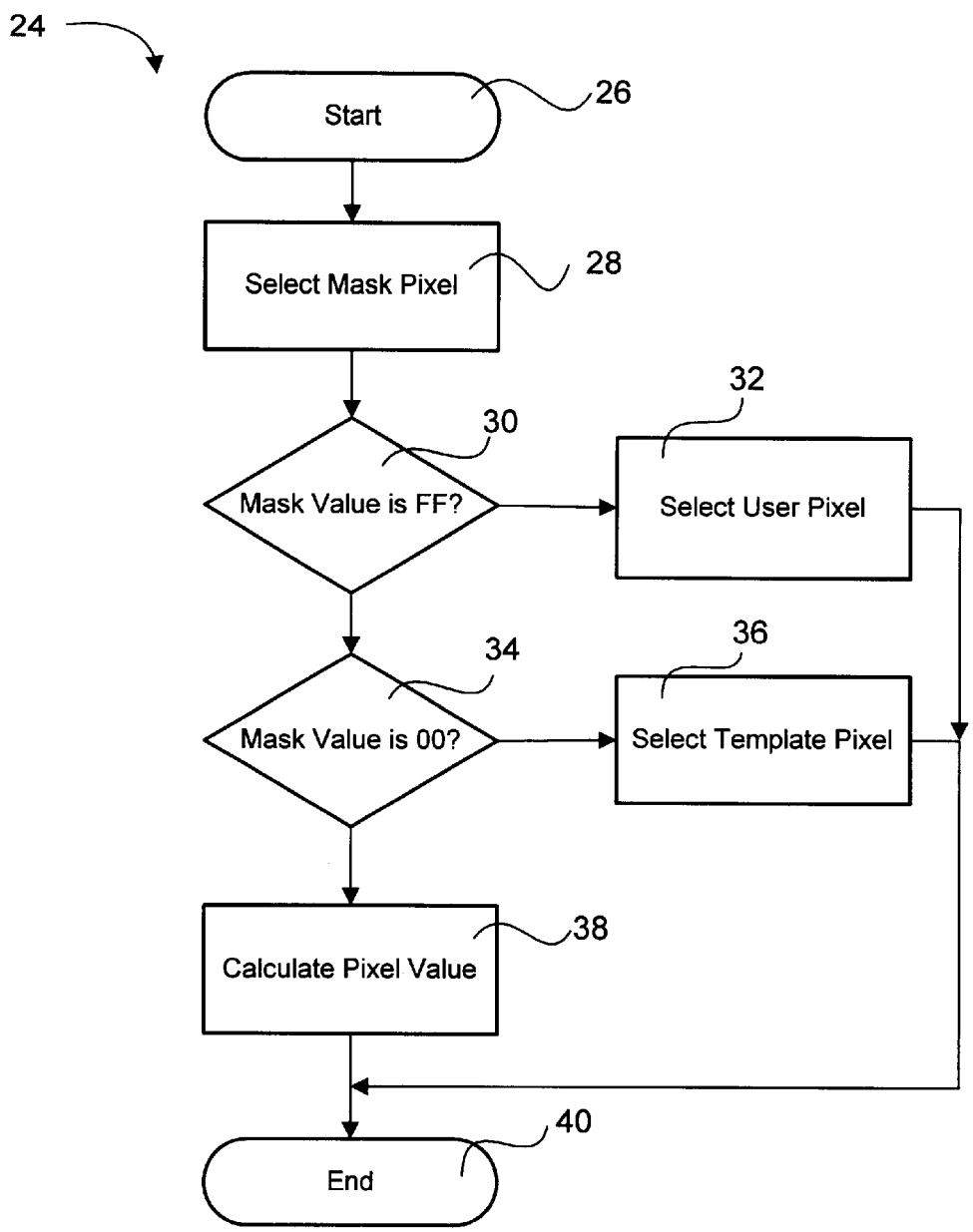
FIG. 4 is a sequence of steps for implementing the method of merging images of FIG. 3.

FIG. 4 is a sequence 24 of steps for determining a pixel value of a merged image 6. The sequence starts in a START step 26 and proceeds to a SELECT MASK PIXEL step 28. Each pixel in the mask 9 is selected to determine a corresponding merged pixel value. The sequence 24 proceeds to a MASK VALUE IS FF? step 30, where the mask value is examined. If it is determined that the mask pixel value is FF, the sequence 24 proceeds to a SELECT USER PIXEL step 32, where a corresponding pixel in the merged image 6 assumes the value of a corresponding pixel in the user image 2. If it is determined that the mask pixel value is not FF, the sequence 24 proceeds to a MASK VALUE IS 0? decision step 34. If it is determined that the mask pixel value is 0, the sequence 24 proceeds to a SELECT TEMPLATE PIXEL step 36, where the corresponding pixel in the merged image 6 assumes the value of a corresponding pixel in the template image 4. If it is determined that the mask pixel value is not 0, the sequence 24 proceeds to a CALCULATE PIXEL VALUE step 38. In this step 38, the mask value is used to calculate the output pixel value according to a relation such as:

$$x = \text{mask}v * \text{template\_pixel\_value} + (1 - \text{mask}v) * \text{user}_{13}\text{ pixel\_value}$$

where x is the output pixel value of the merged image 6, maskv is the mask value corresponding to the output pixel normalized to the value of 1, template_pixel_value is a spatially corresponding pixel value of the template image 4, and user_pixel_value is a spatially corresponding pixel value of the user image 2.

According to the relation given above, the mask value is defined to emphasize either the template pixel or the user pixel. This emphasis can be adjusted to produce a fading or smoothing effect in a merged image 6.

The merged image 6 obtained according to the sequence has attributes of both the template image 4 and the user image 2. Selected portions of the user image 2 are overlaid upon a background in the template image 4. The portions are selected in response to the mask 9 which is derived from the template image 4.

As this mask 9 is also stored in the inkjet printer, it is also advantageous to keep the memory required to store the mask 9 to a minimum. There are many methods for compressing the mask 9. One such method is to encode the mask using RLE, since the mask values are highly repetitive. The following is one way of encoding the mask values or bytes. K-bit symbols, such as 16-bit symbols, can be used to encode the mask values according to a bit format given by a 2-bit TYPE and a 14-bit COUNT. The TYPE bits contain information which indicates the types of bytes which this 16-bit symbol describe. COUNT indicates a number of consecutive bytes of a type indicated by TYPE. In this preferred embodiment, the TYPE bits can have the values according to the following table:

| TYPE | COUNT |
|---|---|
| 00 | gives a count of a run length of 00 |
| 01 | gives a count of a run length of FF |
| 10 | gives a count of fading/weighting bytes |
| 11 | is discarded, since TYPE = 11 is unknown and indicates an error. |

The 14 bits of COUNT can hold a maximum number of 16383. To accommodate a number higher than 16383, another 16-bit symbol immediately following the first 16-bit symbol is used. The following table gives some examples of how these 16-bit symbols are encoded to indicate a certain number of bytes.

| Number of bytes | 14-bit COUNT (in hex) | 16 bits following the 14-bit COUNT |
|---|---|---|
| 1 | 0000 | Next 16-bit symbol |
| 2 | 0001 | Next 16-bit symbol |
| 16382 | 3FFE | Next 16-bit symbol |
| 16383 | 3FFF | 0000 |
| 16384 | 3FFF | 0001 |

The preferred embodiment is used to describe a method of merging two images, a user image 2 and a template image 4. However the method can be used for merging more than two images.

Also, in the preferred embodiment, each mask value has a one-to-one relationship with pixels in the merged image 6. And each pixel in the merged image 6 has spatially corresponding pixels in the user and template images 2, 4. Such a one-to-one relationship is not necessarily required. Incidentally, images of different dimensions and resolutions can be merged.

In the preferred embodiment, the merged image 6 is described as a new and separate image resulting from merging a user image 2 and a template image 4. Those skilled in the art will know that such a separate image will require additional memory. Merging can be performed without the need for a separate merged image. Either the scaled template image 4 or user image 2 can be used for the purpose of holding the merged image 6. After each mask value is determined, it is no longer necessary for the corresponding pixel values in the scaled template or user image to be maintained. The memory used for storing these pixel values can therefore be used to hold pixel values of the resultant merged image 6.

In the preferred embodiment, a pixel in the merged image 6 is described as a combination of corresponding pixel values of the template image 4 and the user image 2 according to the relation. It is known to those skilled in the art that each pixel value is made up of several components, for example, a luminance and chrominance components or RGB components. The relation can either act equally on these different components or unequally according to predetermined weightings for the components.

We claim:

1. A method for determining a pixel value in a merged image, the merged image having an overall composition which is derived from a plurality of images, each image having a pixel value corresponding to the pixel value in the merged image, the method comprising:

providing a mask having a plurality of mask values, each mask value corresponding to a pixel value in the merged image, and setting the pixel value in the merged image to a combination of corresponding pixel values in the plurality of images according to a mask value which corresponds to the pixel value.

2. A method for determining a pixel value in a merged image according to claim 1, wherein setting the pixel value comprises setting the pixel value to a sum of weighted corresponding pixel values in the plurality of images according to weights derived from the mask value.

3. A method for determining a pixel value in a merged image according to claim 2, wherein the plurality of images consists of a first and a second image and wherein setting the pixel value comprises setting the pixel according to the relation:

$$x = maskv * image1\_pixel\_value + (1-maskv) * image2\_pixel\_value$$

where
- x is the pixel value in the merged image,
- maskv is a normalized mask value corresponding to the pixel whose pixel value is given by x,
- image1_pixel_value is the corresponding pixel value of the first image, and
- image2_pixel_value is the corresponding pixel value of the second image.

4. A system for merging a plurality of images into a merged image comprising:
- a mask having values which determine the composition of the merged image; and
- an image generator for generating the merged image in response to the mask values;
- wherein the mask values are derived from attributes in at least one of the plurality of images for identifying in the plurality of images a background and portions to be overlaid upon the background to form the merged image and wherein the merged image include pixels, each of which is a combination of corresponding pixel values of the plurality of images.

5. A system according to claim 4, wherein the plurality of images includes a first image and a second image and wherein the combination of corresponding pixel values is according to a relation:

$$x = maskv * image1\_pixel\_value + (1-maskv) * image2\_pixel\_value$$

where
- x is a pixel value in the merged image,
- maskv is a normalized mask value corresponding to a pixel whose pixel value is given by x,
- image1_pixel_value is a corresponding pixel value of the first image, and
- image2_pixel_value is a corresponding pixel value of the second image.

6. A method for determining a pixel value in a merged image, the merged image having an overall composition which is derived from a plurality of images, each image having a pixel value corresponding to the pixel value in the merged image, the method comprising:
- providing a mask having a plurality of mask values, each mask value corresponding to a pixel value in the merged image; and
- setting each pixel value in the merged image to a sum of weighted corresponding pixel values in the plurality of images according to weights derived from a corresponding mask value.

7. A method for determining pixels of a merged image comprising:
- providing a mask having a plurality of normalized mask values, maskv, wherein a value corresponds to each of the pixels of the merged image; and
- setting the value of each pixel in the merged image to a sum of values of corresponding pixels in a first image and a second image according to a relation defined by:

$$maskv * corresponding\_pixel\_value \text{ in the first image} + (1-maskv) * corresponding\ pixel\ value \text{ in the second image.}$$

* * * * *